(12) United States Patent
Wang et al.

(10) Patent No.: US 9,857,874 B2
(45) Date of Patent: Jan. 2, 2018

(54) AUGMENTED REALITY SYSTEM AND AUGMENTED REALITY INTERACTION METHOD

(71) Applicant: CHUNGHWA PICTURE TUBES, LTD., Taoyuan (TW)

(72) Inventors: Chiang-Shan Wang, Taoyuan (TW); Yue-Li Chao, Taoyuan (TW)

(73) Assignee: CHUNGHWA PICTURE TUBES, LTD., Taoyuan (TW)

( * ) Notice: Subject to any disclaimer, the term of this patent is extended or adjusted under 35 U.S.C. 154(b) by 177 days.

(21) Appl. No.: 14/930,664

(22) Filed: Nov. 3, 2015

(65) Prior Publication Data
US 2017/0123496 A1    May 4, 2017

(51) Int. Cl.
G09G 5/00    (2006.01)
G06F 3/01    (2006.01)
G01B 11/22   (2006.01)
G06T 19/00   (2011.01)
H04N 5/247   (2006.01)

(52) U.S. Cl.
CPC .............. G06F 3/016 (2013.01); G01B 11/22 (2013.01); G06F 3/014 (2013.01); G06F 3/017 (2013.01); G06T 19/006 (2013.01); H04N 5/247 (2013.01)

(58) Field of Classification Search
CPC ......... G06F 3/017; G06F 3/005; G06T 13/40; H04N 5/247; G09B 21/003; G09B 21/04; G10H 2240/211

USPC .......................................................... 345/633
See application file for complete search history.

(56) References Cited

U.S. PATENT DOCUMENTS

| | | | |
|---|---|---|---|
| 9,662,787 B1* | 5/2017 | Jackowski | ............... B25J 9/144 |
| 2012/0056992 A1* | 3/2012 | Kuroda | ................. G06T 19/006 348/46 |
| 2013/0346168 A1 | 12/2013 | Zhou et al. | |
| 2014/0306891 A1* | 10/2014 | Latta | ...................... G06F 3/017 345/158 |
| 2016/0054797 A1* | 2/2016 | Tokubo | ................... G06F 3/012 345/633 |

FOREIGN PATENT DOCUMENTS

TW       I413034 B      10/2013
TW       201419034 A    5/2014

* cited by examiner

*Primary Examiner* — Gregory J Tryder
*Assistant Examiner* — Kwang Lee
(74) *Attorney, Agent, or Firm* — CKC & Partners Co., Ltd.

(57) ABSTRACT

An augmented reality interaction method includes: capturing an identification tag; capturing a depth information corresponding to the identification tag; generating a virtual object according to the identification tag; generating an augmented reality image; and displaying the augmented reality image; wherein, the augmented reality image comprises the virtual object, and when a processor detects that a tactile feedback device touches the virtual object in the augmented reality image according to the depth information, the processor transmits a control signal to the tactile feedback device for controlling the tactile feedback device, and the tactile feedback device provides a hand tactile effect.

8 Claims, 6 Drawing Sheets

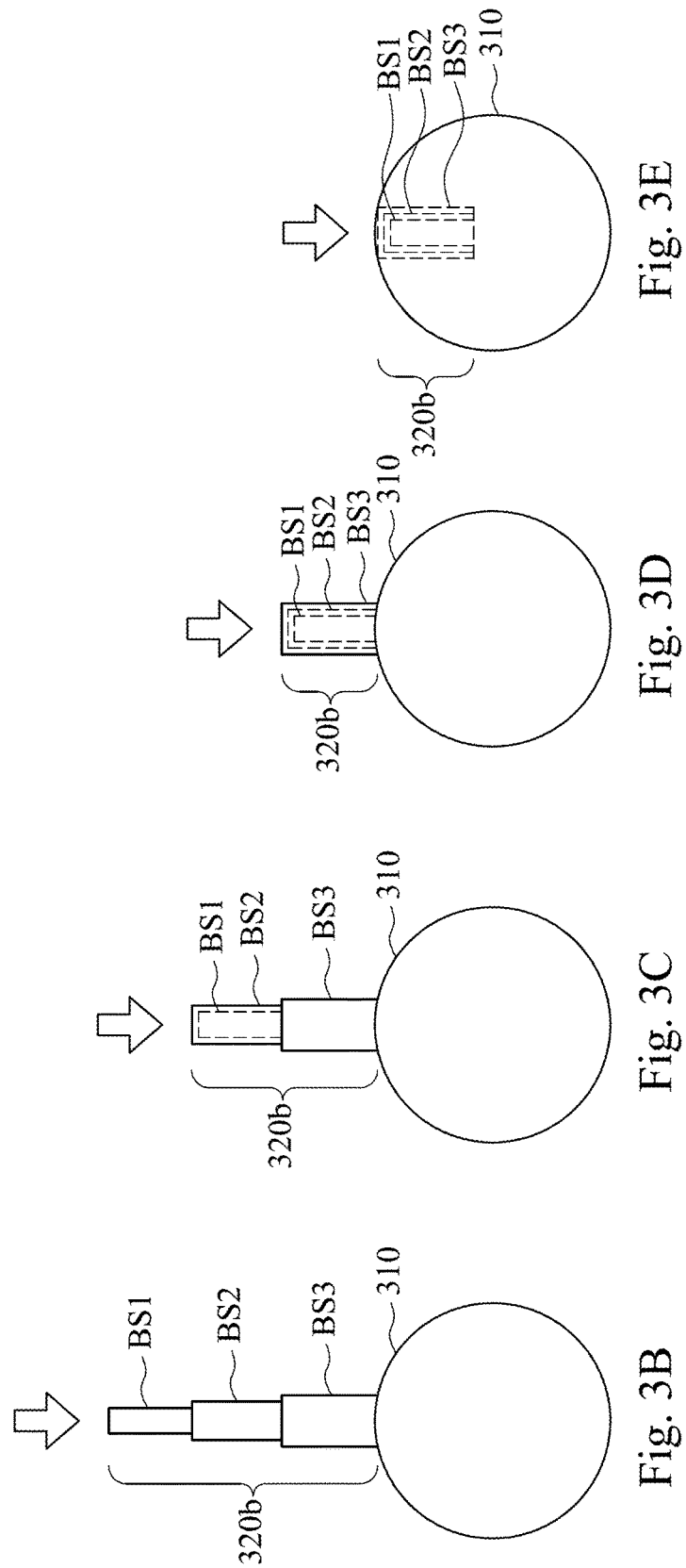

AUGMENTED REALITY SYSTEM AND AUGMENTED REALITY INTERACTION METHOD

BACKGROUND

Field of Invention

The present invention relates to an augmented reality system and augmented reality interaction method thereof. More particularly, the present invention relates to an augmented reality system capable of providing a tactile feedback and an augmented reality interaction method thereof.

Description of Related Art

Recently, augmented reality (AR) technology is widely used in our daily lives. Augmented reality is about mixing virtual information and characters with the actual world. In addition, augmented reality technology can apply for recognizing the 3D position of the real objects and then shows virtual information on the image, such as showing the virtual objects or virtual scenarios on the image. Through the augmented reality image, users can see virtual information overlaid over the real world.

However, augmented reality image provides the visual representation. In general, user cannot touch or sense the virtual object and cannot obtain the further interactive with the augmented reality image. Therefore, how to provide a tactile feedback when user touches the virtual object in the augmented reality image has become a problem in the industry.

SUMMARY

One aspect of the present disclosure is related to an augmented reality system. In accordance with one embodiment of the present disclosure, the augmented reality system includes a tactile feedback device, a first camera device, a second camera device, a processor, and a display. The first camera device captures an identification tag. The second camera device captures a depth information corresponding to the identification tag. The processor generates a virtual object according to the identification tag and generates an augmented reality image. The display displays the augmented reality image. Wherein, the augmented reality image comprises the virtual object, and when the processor detects that the tactile feedback device touches the virtual object in the augmented reality image according to the depth information, the processor transmits a control signal to the tactile feedback device for controlling the tactile feedback device, and the tactile feedback device provides a hand tactile effect.

Another aspect of the present disclosure is related to an augmented reality interaction method. The method includes: capturing an identification tag; capturing a depth information corresponding to the identification tag; generating a virtual object according to the identification tag; generating an augmented reality image; and displaying the augmented reality image; wherein, the augmented reality image comprises the virtual object, and when a processor detects that a tactile feedback device touches the virtual object in the augmented reality image according to the depth information, the processor transmits a control signal to the tactile feedback device for controlling the tactile feedback device, and the tactile feedback device provides a hand tactile effect.

Through utilizing one embodiment described above, the tactile feedback can provide a hand tactile effect when user touches the virtual object in the augmented reality image.

BRIEF DESCRIPTION OF THE DRAWINGS

FIGS. 3A-3E are schematic diagrams of tactile feedback device according to one embodiment of the present invention.

DETAILED DESCRIPTION

Figure 1A:
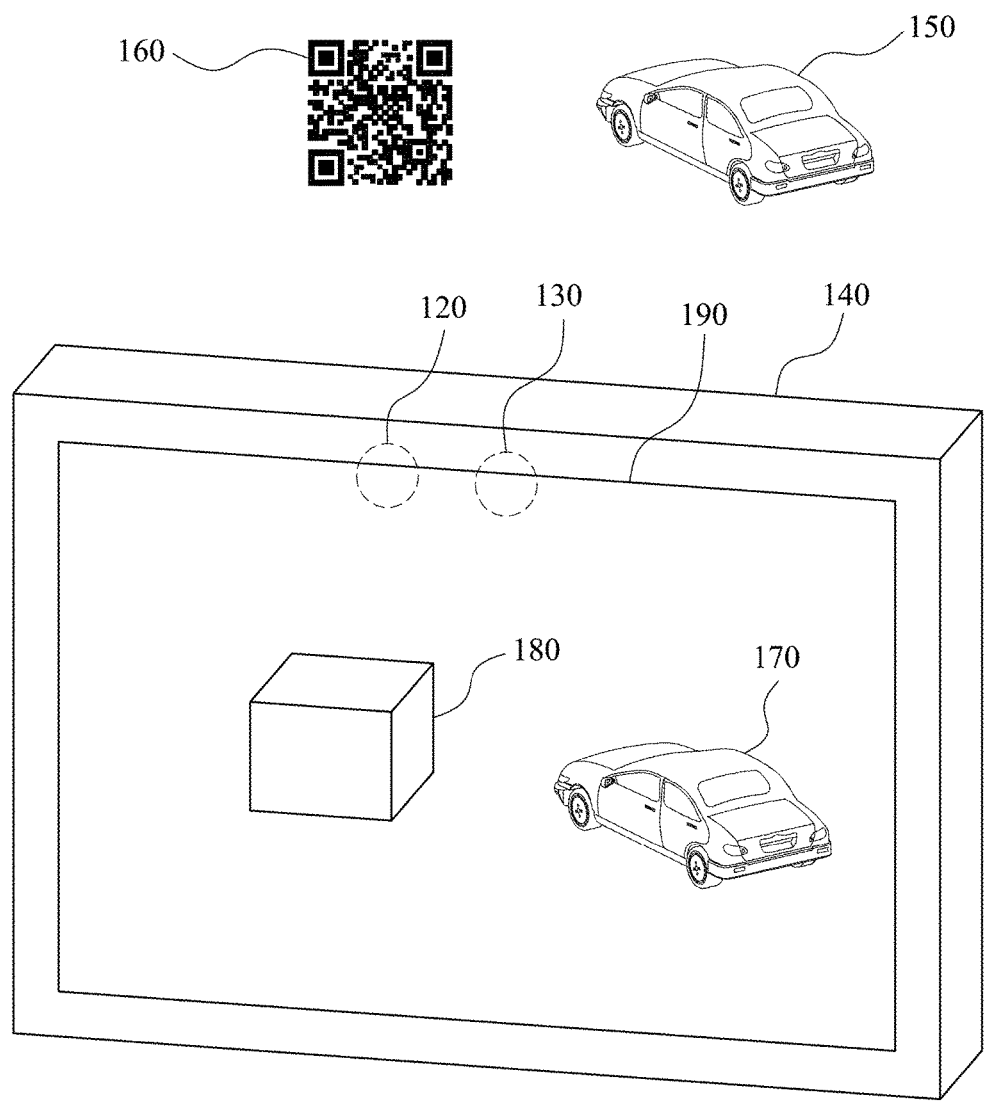
FIGS. 1A-1B are schematic diagrams of an augmented reality system according to one embodiment of the present invention.

Reference will now be made in detail to the present embodiments of the invention, examples of which are illustrated in the accompanying drawings. Wherever possible, the same reference numbers are used in the drawings and the description to refer to the same or like parts.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, when an element is referred to as being "connected" or "electrically connected" to another element, it can be directly connected to the other element or intervening elements may be present. In contrast, when an element is referred to as being "directly connected" to another element, there are no intervening elements present. Moreover, "electrically connect" or "connect" can further refer to the interoperation or interaction between two or more elements.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, unless otherwise defined, all terms (including technical and scientific terms) have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. §112(f). In particular, the use of "step of" in the claims herein is not intended to invoke the provisions of 35 U.S.C. §112(f).

Figure 1B:
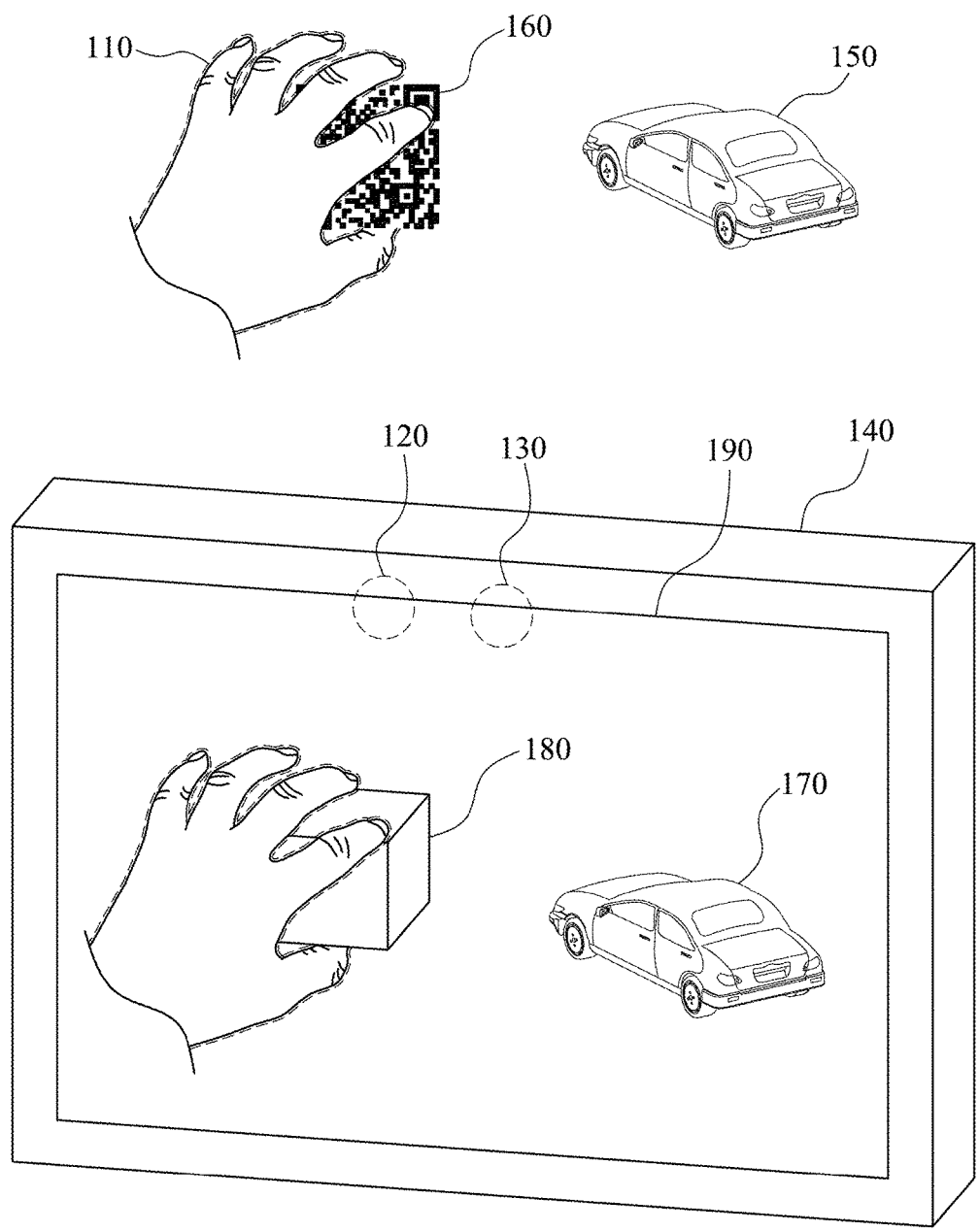
Figure 2:
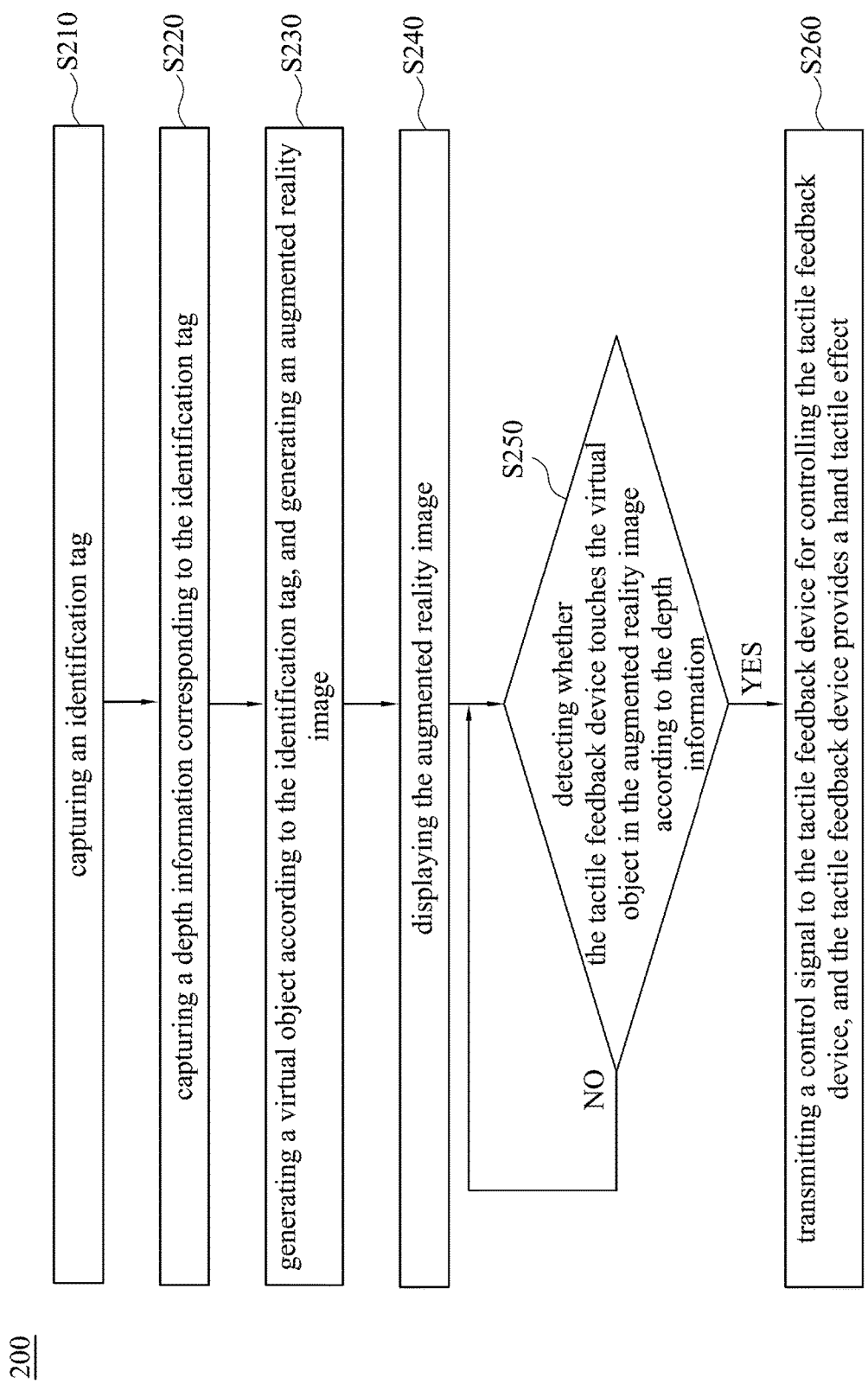
FIG. 2 is a flowchart of a control method according to one embodiment of the present invention.

Reference is made to FIGS. 1A-1B and 2. FIGS. 1A-1B are schematic diagrams of an augmented reality system 100 according to one embodiment of the present invention. FIG. 2 is a flowchart of a control method 200 according to one embodiment of the present invention.

In one embodiment, the augmented reality system 100 includes a tactile feedback device 110, a first camera device 120, a second camera device 130, a processor (not shown), and a display 140. In this embodiment, the first camera device 120 can be any kinds of camera apparatus with photographing function. And, the second camera device 130 can be any kinds of camera apparatus with photographing function and depth detection function, such as an infrared video camera. In one embodiment, the second camera device 130 can be used for measuring the depth information of each object in the image by the infrared radiation. The first camera device 120 and the second camera device 130 are placed in the backside of the display 140. The processor (not shown) is placed in the display 140. The processor is used for performing the kinds of the calculations and controlling processes. For instance, the processor can be a micro chip, a central processing unit (CPU) or a firmware circuitry. The processor can connect to the tactile feedback device 110 by a network component (not shown) placed in the display 140. The network component may be realized by, for example, a wireless signal IC. The display 140 can be implemented in a panel, a notebook, a personal computer, or a smart phone with a screen. Besides, the tactile feedback device 110 is a wearable device and will be described later with FIGS. 3-4.

In this embodiment, the control method shown in FIG. 2 includes the steps below. It should be noted that, in the steps of the following uploading method, no particular sequence is required unless otherwise specified. Moreover, the following steps also may be performed simultaneously or the execution times thereof may at least partially overlap.

Furthermore, the steps of the following uploading method may be added, replaced, and/or eliminated as appropriate, in accordance with various embodiments of the present disclosure.

In step S210, the first camera device 120 captures an identification tag 160.

In one embodiment, as shown in FIG. 1A, the first camera device 120 captures an original image, and the original image (not shown) includes an identification tag 160. In one embodiment, the identification tag 160 can be an icon, a QR code, any other patterns on a card or on objects.

In step S220, the second camera device 130 captures a depth information corresponding to the identification tag 160. For example, in FIG. 1A, the second camera device 130 measures a depth (or distance) between the identification tag 160 and the second camera device 130.

In one embodiment, the original image includes the identification tag 160. The second camera device 130 captures a depth information corresponding to the original image. For example, in FIG. 1A, the second camera device 130 measures a depth (or distance) between the toy car 150 and the second camera device 130 by detecting depth information corresponding to the original image.

In step S230, the processor generates a virtual object 180 according to the identification tag 160 and generates an augmented reality image 190. And, the augmented reality image 190 includes the virtual object 180. In one embodiment, the processor generates an augmented reality image 190 according to the original image. In one embodiment, the toy car 150 can be displayed as a toy car image 170 in the augmented reality image 190.

In FIG. 1A, the original image (not shown) may includes the identification tag 160 and the toy car 150. In addition, both the identification tag 160 and the toy car 150 are real objects in original image captured by the first camera device 120. Through the second camera device 130 captures depth information corresponding to the original image, the second camera device 130 can obtain the 3-dimensional position of the identification tag 160 in original image. Also, the processor generates a virtual object 180 according to the identification tag 160 and generates an augmented reality image 190 according to the original image.

To be more specifically, the identification tag 160 can be predetermined to correspond to a virtual object 180. In one embodiment, the user predetermines that the identification tag 160 corresponds to a specific virtual object, such as a virtual cube block (which is used for presenting a virtual object 180 in following description) in FIGS. 1A-1B. Then, the processor generates the virtual cube block according to the identification tag 160. In addition, the 3-dimensional position of the virtual cube block is determined as the same 3-dimensional position of the identification tag 160 in original image.

After the processor generating the virtual cube block according to the identification tag 160, the virtual cube block can be shown in the augmented reality image 190 according to the position of the identification tag 160 in original image (as shown in FIG. 1A). That is, the augmented reality image 190 includes a virtual object 180 (such as a virtual cube block) located or covered on the 3-dimensional position of the identification tag 160. Therefore, the augmented reality image 190 includes the image of the virtual object 180 (e.g. virtual cube block) and the image of the real object (e.g. toy car 150).

However, the present disclosure is not limited to application to the embodiment shown in FIG. 1A. In other embodiment, the identification tag 160 can be corresponded to other specific virtual object, such as a virtual dog, a virtual phone, a virtual flower, etc.

In step S240, the display 140 displays the augmented reality image 190.

In one embodiment, user can selectively to configure that whether the image of the tactile feedback device 110 needs to be shown, hidden, or replaced by other virtual object (e.g. the tactile feedback device 110 can be shown as a virtual glove) in the augmented reality image 190.

In step S250, the processor detects whether the tactile feedback device 110 touches the virtual object 180 in the augmented reality image 190 according to the depth information. If the processor detects that a tactile feedback device 110 touches the virtual object 180 in the augmented reality image 190 according to the depth information, the step S260 is performed. Else, if the processor does not detect that a tactile feedback device 110 touches the virtual object in the augmented reality image 190 according to the depth information, the step S250 will keep performing.

For example, after user wearing the tactile feedback device 110 on hand, the user touches the identification tag 160 in reality. In this condition, the processor determines that the tactile feedback device 110 touches the virtual object 180 in the augmented reality image 190 due to the tactile feedback device 110 and the virtual object 180 have the same depth information, and/or due to the at least one part of the tactile feedback device 110 is overlapped with the virtual object 180 in the augmented reality image 190. In this way, the processor can detect that a tactile feedback device 110 touches the virtual object 180 (e.g. cube block) in the augmented reality image 190 according to the depth information. Therefore, user can interact with the virtual object 180, such as moving the virtual object 180 or rotating the virtual object 180. And, the interactive activity is displayed in the augmented reality image 190.

In step S260, the processor transmits a control signal to the tactile feedback device 110 for controlling the tactile feedback device 110, and the tactile feedback device 110 provides a hand tactile effect.

In one embodiment, when the processor detects that the tactile feedback device 110 touches the virtual object 180 in the augmented reality image 190 according to the depth information (as shown in FIG. 1B), the processor transmits a control signal to the tactile feedback device 110 for controlling the tactile feedback device 110, and the tactile feedback device 110 provides a hand tactile effect.

To be more detailed, the tactile feedback device 110 can be implemented as a wearable device with tactile feedback function. For example, user can wear the tactile feedback device 110 on the hand and then try to interact with the virtual object 180 (see FIG. 1B). During the interaction, the first camera device 120 captures an original image having the tactile feedback device 110, the identification tag 160, and the real object (e.g. toy car 150). The second camera device 130 captures an original image having the depth information of tactile feedback device 110, the depth information of the identification tag 160, and the depth information of the real object (e.g. toy car 150). The processor generates a virtual object 180 according to the identification tag 160. And then, the processor generates an augmented reality image 190 according to the original images captured by the first camera device 120 and the second camera device 130. In this way, the content of the augmented reality image 190 includes the image of the tactile feedback device 110 and the virtual object 180.

Next, the processor detects that whether the tactile feedback device 110 touches the virtual object 180 in the augmented reality image 190 according to the depth information.

In one embodiment, the processor determines the tactile feedback device 110 touches the virtual object 180 in the augmented reality image 190 when the tactile feedback device 110 and the virtual object 180 have the same depth information, and/or the at least one part of the tactile feedback device 110 is overlapped with the virtual object 180 in the augmented reality image 190.

In another embodiment, when the processor detects that the tactile feedback device 110 touches the virtual object 180 in the augmented reality image 190 according to the depth information (see FIG. 1B), the virtual object 180 (e.g. the cube block) is rotated or moved according to an operation gesture received by the tactile feedback device 110.

As such, user can interact with the virtual object 180 when the processor detects the tactile feedback device 110 touches the virtual object 180 in the augmented reality image 190.

Further, the augmented reality system 100 can provide tactile feedback while user interactive with the virtual object 180. The technical feature related to the tactile feedback is described below.

In one embodiment, the hand tactile effect includes a vibrating effect or a restriction effect on hand. When the processor detects that the tactile feedback device 110 touches the virtual object 180 in the augmented reality image 190 according to the depth information (see FIG. 1B), the processor transmits a control signal to the tactile feedback device 110 for controlling the tactile feedback device. Then, the tactile feedback device 110 performs the vibrating effect or restriction the behavior (or action) of the user's hand according to the control signal.

In this way, the tactile feedback device 110 can provide a hand tactile effect when user touches the virtual object 180 in the augmented reality image 190.

In the following paragraphs, details of the present disclosure are provided with reference to the tactile feedback device 110 as shown in FIGS. 3A-3E and FIG. 4.

However, the present disclosure is not limited to the embodiment below. The augmented reality interaction method shown in FIG. 2 can be applied with the tactile feedback device 110 as shown in FIGS. 3A-3E and/or FIG. 4.

FIGS. 3A-3E are schematic diagrams of a tactile feedback device 300 according to one embodiment of the present invention. The tactile feedback device 300 includes an elastic sphere 310, at least one brace structure 320a-320e, and at least one fingerstall 330a-330e. Each of the at least one brace structure 320a-320e has a first terminal and a second terminal. The first terminal of the at least one brace structure 320a-320e is connected to the elastic sphere 310, and the second terminal of the at least one brace structure 320a-320e is connected to a corresponded fingerstall 330a-330e.

In one embodiment, the amount of the at least one fingerstall 330a-330e is the same as the amount of the at least one brace structure 320a-320e. For example, there are five fingerstalls 330a-330e corresponding to five brace structures 320a-320e in FIG. 3A.

In one embodiment, the elastic sphere 310 is a sphere with elasticity. And, the elastic sphere 310 can be hold (or caught) by a user's hand. However, the elastic sphere 310 is not limited to a sphere shape, it can be ellipsoid or other irregular shapes. Besides, the elastic sphere 310 can be made of rubber material, resin material, or foam material, etc.

In one embodiment, the brace structures 320a-320e are the hydraulic brace structure. The hydraulic brace structure uses the hydraulic power to stretch out and/or draw back. The hydraulic power is controlled directly or automatically by a control chip 360 and distributed through the brace structures 320a-320e. In this way, the control chip 360 can control the draw back level and the stretch out level of the brace structures 320a-320e. The brace structures 320a-320e can be made of hoses or tubes with stretch out and/or draw back function. In another embodiment, each of the brace structures 320a-320e can be made of three-part form tubes. As shown in FIG. 3B, FIG. 3B presents a three-part form tubes structure of the brace structure 320b. In this embodiment, the length of the first tube BS1 is one centimeter. The length of the second tube BS2 is two centimeters. The length of the third tube BS3 is three centimeters. However, the length of the first tube BS1, the second tube BS2 and the third tube BS3 should not be limited thereto. In practice, the length of the first tube BS1, the second tube BS2 and the third tube BS3 can be designed according to the lengths of user's fingers. In one embodiment, the first tube BS1, the second tube BS2 and the third tube BS3 have the same length.

Figure 3A:
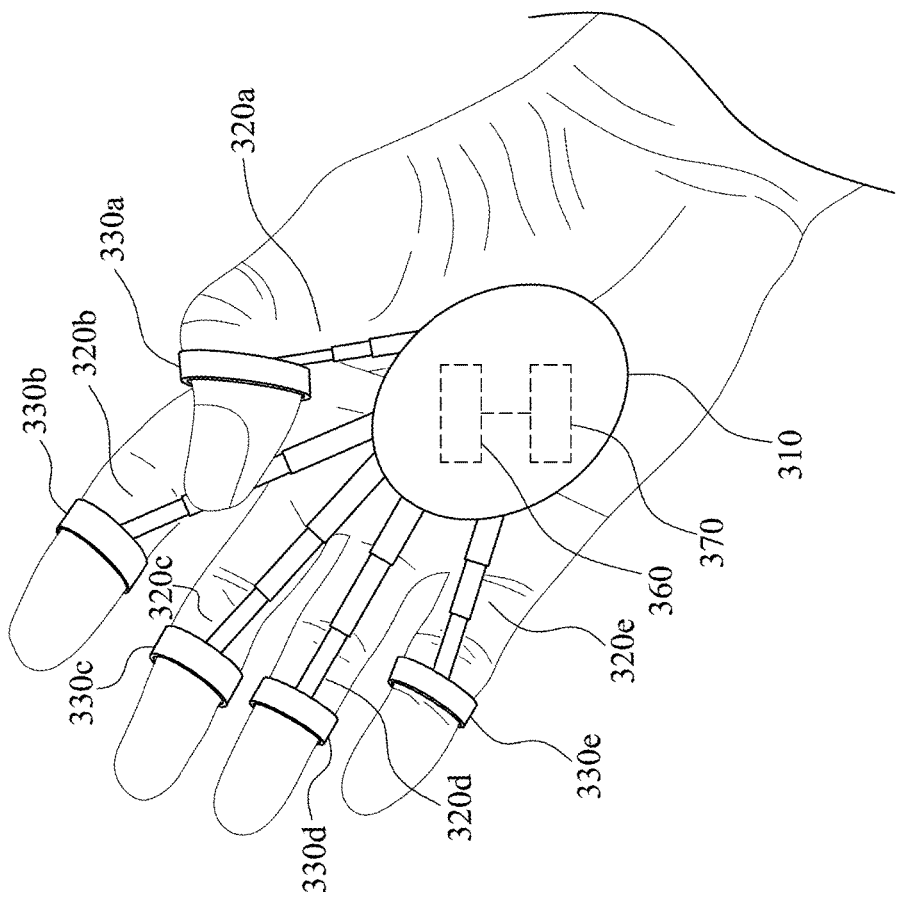

Further, as shown in FIG. 3B, the third tube BS3 encircles the second tube BS2. And, the second tube BS2 encircles the first tube BS1. Therefore, the first tube BS1 can stretch out from and/or draw back into the second tube BS2. For example, FIG. 3C shows that the first tube BS1 draws back into the second tube BS2 when a user's finger presses the brace structure 320b. In addition, the second tube BS2 can stretch out from and/or draw back into the third tube BS3. For example, FIG. 3D shows that the second tube BS2 draws back into the third tube BS3 when a user's finger presses the brace structure 320b. Also, the third tube BS3 can stretch out from and/or draw back into the elastic sphere 310. For example, FIG. 3E shows that the third tube BS3 draws back into the elastic sphere 310 when a user's finger presses the brace structure 320*b*. Further, other brace structures 320*a*, 320*c*-320*e* can be implement by the same structure as shown in FIG. 3A. In this way, the at least one brace structure 320*a*-320*e* has extensibility to stretch out and/or draw back. And, an extending length of the at least one brace structure 320*a*-320*e* is reduced while the at least one brace structure 320*a*-320*e* being pressed.

In one embodiment, each fingerstall 330*a*-330*e* can tie up each user's finger. For example, fingerstall 330*b* ties up the user's forefinger in FIG. 3A. In addition, the first terminal of the brace structure 320*b* is connected (or stuck by glue material) to the elastic sphere 310, and the second terminal of the brace structure 320*b* is connected (or stuck by glue material) to a corresponded fingerstall 330*b*. On the other hand, the fingerstalls 330*a*-330*e* can be implemented as a metal ring type fingerstall, a plastic ring type fingerstall, a nylon bandage, or other material can used for fixing each brace structure 320*a*-320*e* on each user's finger.

In another embodiment, the interior of elastic sphere 310 includes a communication device 360 and a control chip 370. The communication device 360 uses for receiving the control signal from the processor. The communication device may be realized by, for example, a wireless signal receiver. The control chip 370 uses for adjusting a hydraulic level according to the control signal to limit a draw back level length of the at least one brace structure 320*a*-320*e* while the at least one brace structure 320*a*-320*e* being pressed.

In one embodiment, when the processor detects that the tactile feedback device 110 touches the virtual object 180 in the augmented reality image 190, the processor transmits a control signal to the tactile feedback device 110 for controlling the tactile feedback device 110. And, the communication device 360 of the tactile feedback device 110 receives the control signal from the processor and transmits the control signal to the control chip 370. And, the control chip 370 provides a hand tactile effect according to the control signal.

In one embodiment, the control chip 370 restricts the draw back level of the at least one brace structure 320*a*-320*e* according to the control signal when the processor detects that the tactile feedback device 110 touches the virtual object 180 in the augmented reality image 190.

In some embodiment, a draw back level can be used for determining the maximum draw back length of the at least one brace structure 320*a*-320*e* while the at least one brace structures 320*a*-320*e* being pressed.

As shown in FIG. 3C, a draw back level is determined as one centimeter when the processor detects that the tactile feedback device 110 touches the virtual object 180 (e.g. an edge of a virtual table) in the augmented reality image 190. In other words, the user's finger can only press down the brace structure 320*b* at mostly one centimeter (see FIG. 3C). In one embodiment, the length of the first tube BS1 is one centimeter (see FIG. 3B). In this case, the first tube BS1 draws back into the second tube BS2 when a user's finger presses the brace structure 320*b* (see FIG. 3C).

In another embodiment, as shown in FIG. 3D, a draw back level is determined as three centimeters when the processor detects that the tactile feedback device 110 touches the virtual object 180 (e.g. a virtual sofa) in the augmented reality image 190. In other words, the user's finger can only press down the brace structure 320*b* at mostly three centimeters (see FIG. 3D). In one embodiment, the length of the first tube BS1 is one centimeter, and the length of the second tube BS2 is two centimeters. Thus, the total length of both the first tube BS1 and the second tube BS2 is three centimeters. And, the length of the third tube BS3 is three centimeters. Before a user's finger pressing the brace structure 320*b*(see FIG. 3B), the extending length of the brace structure 320*b* is six centimeters. To be more specified, the extending length here means that the total length of the first tube BS1, the second tube BS2, and the third tube BS3 is six centimeters (see FIG. 3B). When a user's finger presses the brace structure 320*b* (see FIG. 3D), the first tube BS1 draws back into the second tube BS2, and the second tube BS2 draws back into the third tube BS3. As such, the extending length of the brace structure 320*b* is reduced after the user's finger pressing the brace structure 320*b*.

In another embodiment, as shown in FIG. 3E, a draw back level is determined as six centimeters when the processor detects that the tactile feedback device 110 does not touch any the virtual object 180 in the augmented reality image 190. It means that the user's finger can press down six centimeters of the brace structures 320*a* (see FIG. 3E). In this case, the first tube BS1 draws back into the second tube BS2, the second tube BS2 draws back into the third tube BS3, and then the whole third tube BS3 draws back into the elastic sphere 310 when a user's finger presses the brace structure 320*b*. As such, the extending length of the brace structure 320*b* is reduced after the user's finger pressing the brace structure 320*b*.

Besides, the brace structures 320*a*, 320*c*-320*e* may have the same structure as the brace structure 320*b*. Thus, the brace structures 320*a*, 320*c*-320*e* can apply the same technical features as the brace structure 320*b* above mentioned.

In some embodiment, the draw back level is determined by the processor according to the kinds of virtual object 180 (e.g. a table, a toy car, a sofa) in the augmented reality image 190. For example, the touching sense of a sofa should be softer than a table in reality word. As such, the draw back level can be determined as one centimeter corresponding to the virtual table. And, the draw back level can be determined as three centimeter corresponding to the virtual sofa. Therefore, the draw back level of the virtual sofa (e.g. two centimeters, as shown in FIG. 3D) is determined more than the draw back level of the virtual table (e.g. one centimeter, as shown in FIG. 3C). Then, the processor transmits the control signal corresponding to the determined draw back level to the tactile feedback device 300.

As such, the user's finger will feel a restriction effect by determining the draw back level of the brace structures 320*a*-320*e* while the brace structures 320*a*-320*e* being pressed. This can provide user the tactile sensation like touching the real object.

Figure 4:
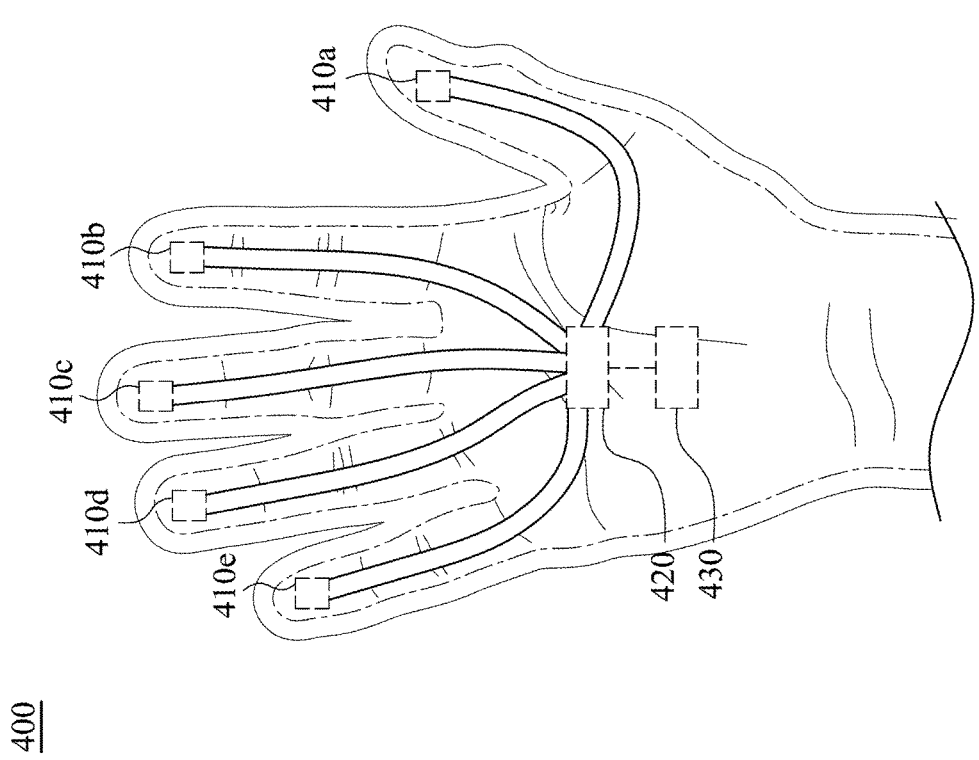
FIG. 4 is a schematic diagram of tactile feedback device according to one embodiment of the present invention.

Referring to FIG. 4, FIG. 4 is a schematic diagram of a tactile feedback device 400 according to one embodiment of the present invention.

In this embodiment, the tactile feedback device 110 is a glove. The tactile feedback device 110 includes a plurality of vibrating sensors 410*a*-410*e*, a communication device 430, and a control chip 420. The communication device 430 uses for receiving the control signal from the processor. The control chip 420 uses for enabling the vibrating sensors 410*a*-410*e* to provide the vibrating effect according to the control signal.

For example, when the processor detects that the tactile feedback device 110 touches the virtual object 180 in the augmented reality image 190, the processor transmits a control signal to the tactile feedback device 110 for controlling the tactile feedback device 110. And, the vibrating sensors 410*a*-410*e* of tactile feedback device 110 provide vibrating effect according to the control signal. As such, the user can feel the vibrating effect by hand when the processor detects that the tactile feedback device 110 touches the virtual object 180 in the augmented reality image 190.

Based on aforesaid embodiments, the augmented reality interaction method and the tactile feedback device can further provide a hand tactile effect while user interactive with the virtual object. However, the present disclosure is not limited in this regard, another communication technology is within the contemplate scope of the present disclosure.

Although the present invention has been described in considerable detail with reference to certain embodiments thereof, other embodiments are possible. Therefore, the scope of the appended claims should not be limited to the description of the embodiments contained herein.

What is claimed is:

1. An augmented reality system, comprising:
   a tactile feedback device, comprising:
      an elastic sphere;
      at least one fingerstall; and
      at least one brace structure, each of the at least one brace structure has a first terminal and a second terminal, wherein the first terminal of the at least one brace structure is connected to the elastic sphere, and the second terminal of the at least one brace structure is connected to a corresponded fingerstall;
      wherein, the amount of the at least one fingerstall is the same as the amount of the at least one brace structure;
   a first camera device for capturing an identification tag;
   a second camera device for capturing a depth information corresponding to the identification tag;
   a processor for generating a virtual object according to the identification tag, and generating an augmented reality image;
   a display for displaying the augmented reality image;
   wherein, the augmented reality image comprises the virtual object, and when the processor detects that the tactile feedback device touches the virtual object in the augmented reality image according to the depth information, the processor transmits a control signal to the tactile feedback device for controlling the tactile feedback device, and the tactile feedback device provides a hand tactile effect, wherein the hand tactile effect comprises a vibrating effect or a restriction effect on hand.

2. The augmented reality system of claim 1, wherein the augmented reality image comprises the image of the tactile feedback device; and
   when the processor detects that the tactile feedback device touches the virtual object in the augmented reality image according to the depth information, the virtual object is rotated or moved according to an operation gesture received by the tactile feedback device.

3. The augmented reality system of claim 1, wherein the at least one brace structure has extensibility, and an extending length of the at least one brace structure is reduced while the at least one brace structure being pressed.

4. The augmented reality system of claim 1, wherein the at least one brace structure is a hydraulic brace structure, and the interior of the elastic sphere comprises:
   a communication device for receiving the control signal from the processor; and
   a control chip for adjusting a hydraulic level according to the control signal to limit a draw back level of the at least one brace structure while the at least one brace structure being pressed.

5. An augmented reality interaction method associated with a tactile feedback device, wherein the tactile feedback device comprises an elastic sphere, at least one fingerstall and at least one brace structure, wherein each of the at least one brace structure has a first terminal and a second terminal, wherein the first terminal of the at least one brace structure is connected to the elastic sphere, and the second terminal of the at least one brace structure is connected to a corresponded fingerstall, wherein the amount of the at least one fingerstall is the same as the amount of the at least one brace structure, and the augmented reality interaction method comprising:
   capturing an identification tag;
   capturing a depth information corresponding to the identification tag;
   generating a virtual object according to the identification tag;
   generating an augmented reality image; and
   displaying the augmented reality image;
   wherein, the augmented reality image comprises the virtual object, and when a processor detects that a tactile feedback device touches the virtual object in the augmented reality image according to the depth information, the processor transmits a control signal to the tactile feedback device for controlling the tactile feedback device, and the tactile feedback device provides a hand tactile effect, wherein the hand tactile effect comprises a vibrating effect or a restriction effect on hand.

6. The augmented reality interaction method of claim 5, wherein the augmented reality image comprises the image of the tactile feedback device; and
   when the processor detects that the tactile feedback device touches the virtual object in the augmented reality image according to the depth information, the virtual object is rotated or moved according to an operation gesture received by the tactile feedback device.

7. The augmented reality interaction method of claim 5, wherein the at least one brace structure has extensibility, and an extending length of the at least one brace structure is reduced while the at least one brace structure being pressed.

8. The augmented reality interaction method of claim 5, wherein the at least one brace structure is a hydraulic brace structure, and the method comprises:
   receiving the control signal from the processor; and
   adjusting a hydraulic level according to the control signal to limit a draw back level of the at least one brace structure while the at least one brace structure is being pressed.

* * * * *